(12) United States Patent  
Johnston

(10) Patent No.: US 8,098,942 B2  
(45) Date of Patent: Jan. 17, 2012

(54) SYSTEMS AND METHODS FOR COLOR DATA COMPRESSION

(75) Inventor: Peter Johnston, San Francisco, CA (US)

(73) Assignee: Konica Minolta Systems Laboratory, Inc., Tokyo (JP)

( * ) Notice: Subject to any disclaimer, the term of this patent is extended or adjusted under 35 U.S.C. 154(b) by 870 days.

(21) Appl. No.: 12/165,596

(22) Filed: Jun. 30, 2008

(65) Prior Publication Data

US 2009/0324109 A1    Dec. 31, 2009

(51) Int. Cl.
G36K 9/36 (2006.01)
G36K 9/46 (2006.01)
G36K 9/00 (2006.01)
G36K 15/02 (2006.01)

(52) U.S. Cl. ........ 382/232; 382/235; 382/116; 382/239; 358/1.2

(58) Field of Classification Search .................. 382/232, 382/235, 116, 239; 358/1.2
See application file for complete search history.

(56) References Cited

U.S. PATENT DOCUMENTS

| | | | | |
|---|---|---|---|---|
| 5,610,646 A | * | 3/1997 | Isaka et al. | 347/131 |
| 5,680,488 A | * | 10/1997 | Shimooku | 382/298 |
| 5,841,552 A | * | 11/1998 | Atobe et al. | 358/447 |
| 6,041,165 A | * | 3/2000 | Morikawa | 358/1.2 |
| 6,106,093 A | * | 8/2000 | Nagoshi et al. | 347/15 |
| 6,342,950 B1 | * | 1/2002 | Tabata et al. | 358/1.6 |
| 6,402,294 B2 | * | 6/2002 | Minowa | 347/19 |
| 6,552,819 B2 | * | 4/2003 | Osawa et al. | 358/1.17 |
| 6,570,672 B1 | * | 5/2003 | Hattori | 358/1.2 |
| 6,614,553 B2 | * | 9/2003 | Nakami et al. | 358/1.2 |
| 6,776,544 B2 | * | 8/2004 | Jauert | 400/120.01 |
| 7,380,929 B2 | * | 6/2008 | Silverbrook | 347/104 |

* cited by examiner

*Primary Examiner* — Vu Le
*Assistant Examiner* — Ha Le
(74) *Attorney, Agent, or Firm* — Finnegan, Henderson, Farabow, Garrett & Dunner, L.L.P.

(57) ABSTRACT

Systems and methods are provided for reducing data size of at least one bitmap image, wherein the bitmap image comprises a plurality of color blocks, wherein each color block is associated with a distinct color plane. In some embodiments, the bitmap image may be compressed. At least one compressed color block that is contained in a transfer frame may be determined, based on information pertaining to a physical offset between successive color planes when they are rendered on a print medium. Further, at least one compressed color block in the transfer frame may be tagged, if the size of the transfer frame exceeds a threshold, and the resolution of the at least one compressed color block that is tagged may be reduced.

20 Claims, 7 Drawing Sheets

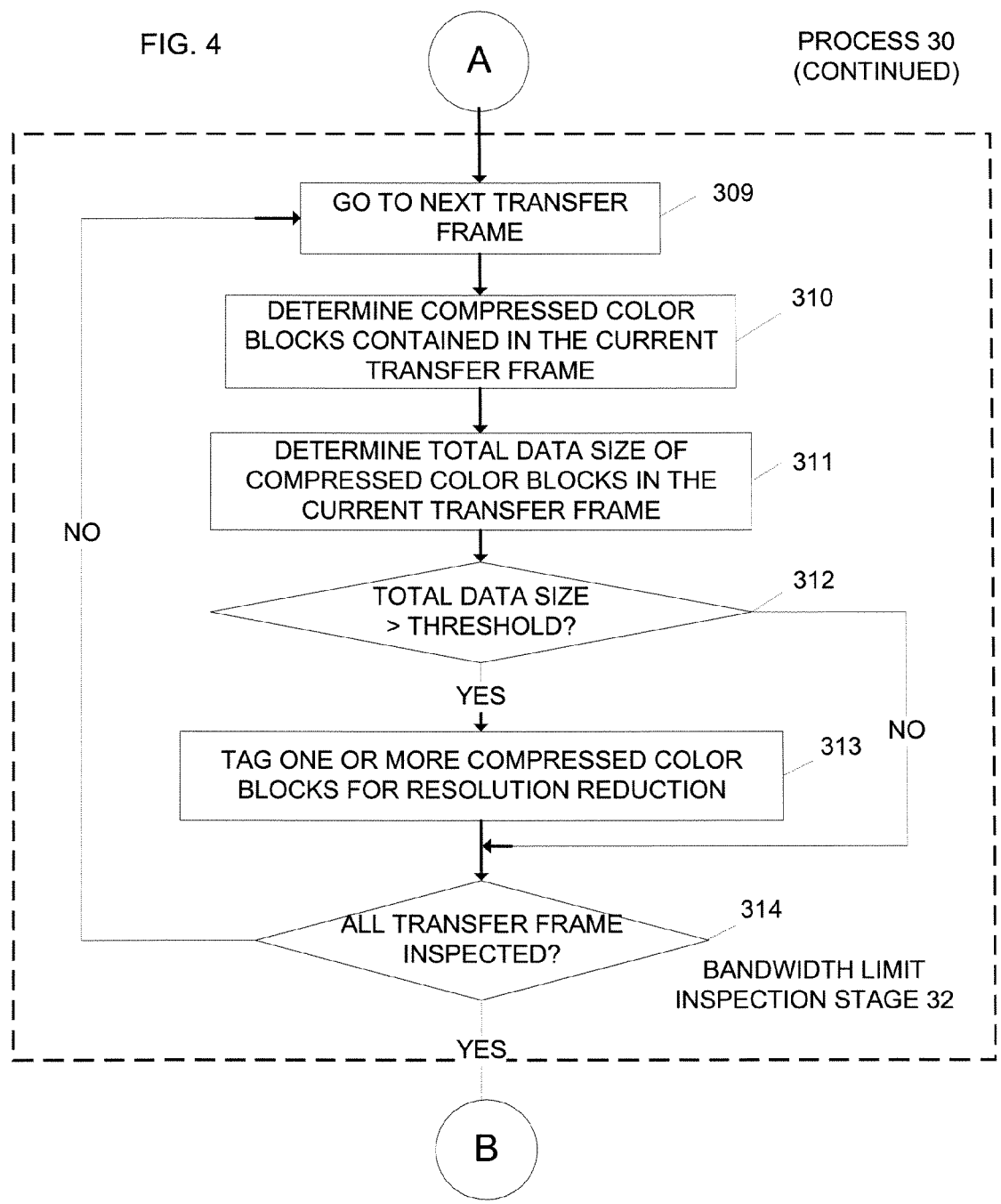

SYSTEMS AND METHODS FOR COLOR DATA COMPRESSION

TECHNICAL FIELD

This disclosure relates to data compression for printing systems and in particular, to systems and methods for color data compression on laser printers.

DESCRIPTION OF RELATED ART

A typical printing system may include a print engine that controls various mechanical and electrical parts configured to print data on a page at a predetermined print speed. The print engine is usually controlled by a print controller, which communicates with a print data input device (e.g., a personal computer) and the print engine, to coordinate timing and other parameters related to the printing process. The print controller may receive image data for printing from the input device at an appropriate rate via a data transferring interface, can generate rasterized images, and send them to the print engine for printing.

Some printing systems, such as laser printing systems, may have hard real-time requirements so that once a print job has been initiated, data transfers to the print engine may occur at some set speed without interruption. For instance, in a laser printing system, which is one of a class of page printers, data for each page can be transferred to the print engine at an appropriate speed without interruption. However, the bandwidth of the data transferring interface sometimes may not be sufficient to sustain the print speed. For instance, a page containing high resolution images may have a large data size even after image compression. When such a page is being transferred to the print controller from a printer at the print speed, the image data may exceed the bandwidth for some time period. As a result, the page for printing may not be completely transmitted to the print controller and print engine before the start of physical printing, resulting in a data underrun. Consequently, the page may not be printed properly. The performance of the printing system may therefore be significantly compromised.

Conventional printer controllers may include a page buffer capable of buffering an entire page before printing commences. This may allow for some flexibility in how the print data is transferred to the print controller from the printer. For example, in order to store a full page of print data including high resolution images, the print controller may use a large amount of additional memory for both code and data storage. This may add substantial cost to the printing system. In addition, memory cannot typically be added by users to many existing printers, so an approach using additional memory will not help printers already on the market. Therefore, there is a need for systems and methods that provide a reliable printing solution that can be implemented for existing printers, and that reduces memory requirements in the print engine.

SUMMARY

Systems and methods disclosed provide for reducing data size of at least one bitmap image, wherein the bitmap image comprises a plurality of color blocks, wherein each color block is associated with a distinct color plane. In some embodiments, the bitmap image may be compressed. At least one compressed color block that is contained in a transfer frame may be determined, based on information pertaining to a physical offset between successive color planes when they are rendered on a print medium. Further, at least one compressed color block in the transfer frame may be tagged, if the size of the transfer frame exceeds a threshold, and the resolution of the at least one compressed color block that is tagged may be reduced.

Embodiments disclosed also relate to software, firmware, and program instructions created, stored, accessed, or modified by processors using computer-readable media or computer-readable memory. The methods described may also be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
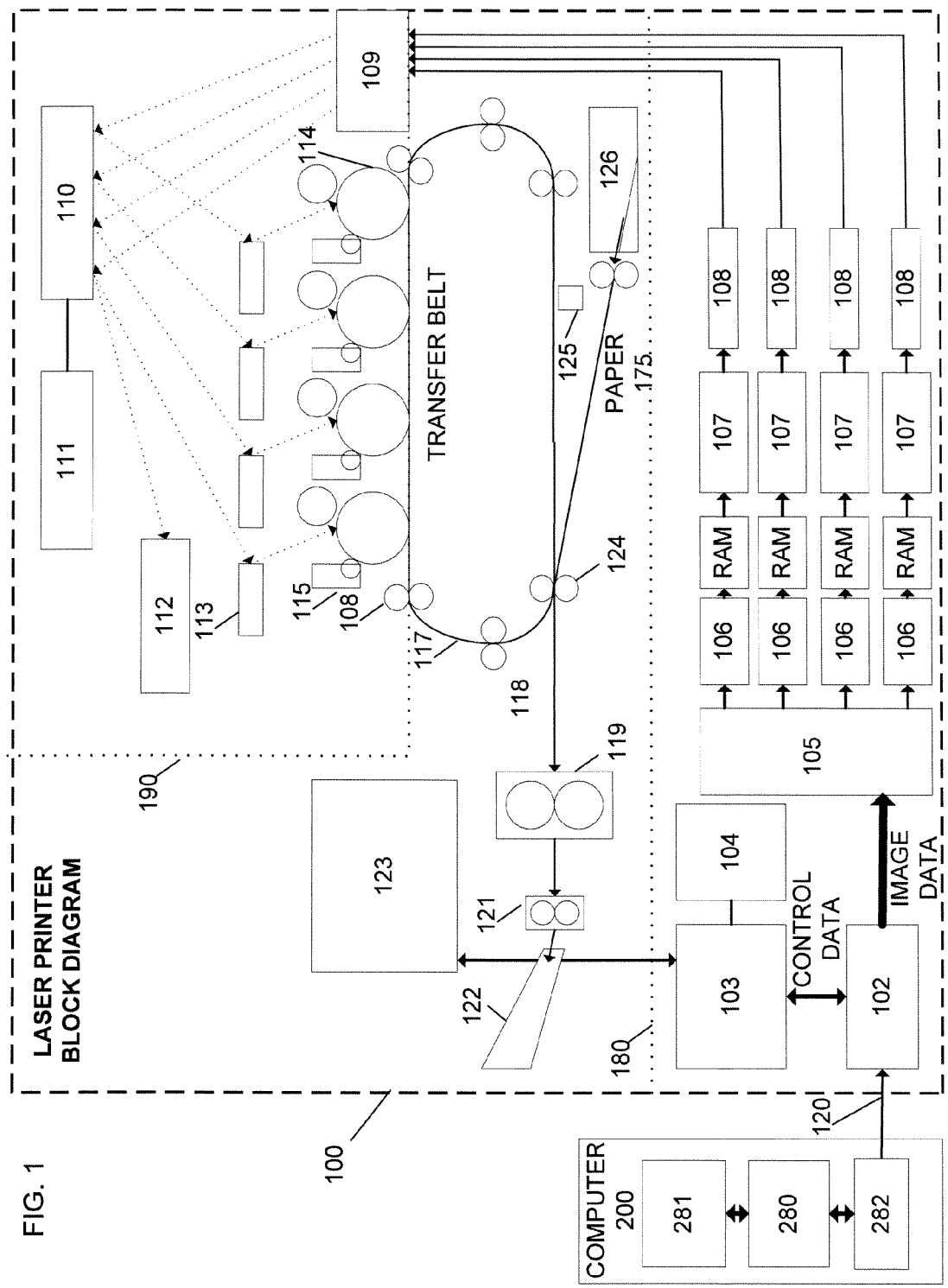
FIG. 1 shows a block diagram of an exemplary printer.

FIG. 1 is a block diagram of exemplary printer 100, which is coupled to exemplary computer 200. In some embodiments, printer 100 may be a laser printer, an LED printer, or any other printer consistent with principles of the present invention. Connection 120 couples computer 200 and printer 100 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 200, and printer 100.

In some embodiments, connection 120 may operate at a predetermined data transferring frequency, or may otherwise have limited bandwidth. For example, connection 120 may operate at a determined frequency of 480 MHz and the corresponding maximum raw bandwidth may be 60 M bytes per second. In some embodiments, the maximum transfer rate of raw data may be lower than the maximum raw bandwidth due to encoding and protocol overhead. Under some exemplary protocols, an isochronous mode of transfer may be supported so that a certain amount of bandwidth may be reserved and data delivery at a corresponding transfer rate may be guaranteed. For example, a certain amount of bandwidth may be reserved for each C/M/Y/K image component, and data delivery at the corresponding transfer rate may be guaranteed. The guaranteed transfer rate may be designed to support the rate at which the print engine consumes image data, and/or the print speed of printer 100, to ensure that data under-runs do not occur on printer 100.

In some embodiments, when a multi-component image such as a color image is printed, image data of the multiple color planes may share the available bandwidth of connection 120. For example, for CMYK color printers, which use cyan ("C"), magenta ("M"), yellow ("Y"), and black ("K") toning materials or developing agents, the print color data may have four planes and may be transferred simultaneously via connection 120. In some embodiments, the bandwidth of connection 120 may be divided into a plurality of sub-channels, and certain amounts of bandwidth may be reserved for each channel, and data delivery at a corresponding transfer rate may be guaranteed for each channel. Data may be transferred via the plurality of sub-channels in a parallel manner. In some embodiments, the same bandwidth may be reserved for each sub-channel. In some embodiments, different bandwidths may be reserved for different sub-channels.

In one exemplary embodiment, USB interface 102 may be used as an interface to receive data via a serial pipe. It is contemplated that other interfaces may be used to receive data via other types of connection 120, such as, for example, FIREWIRE or wireless. Data received by USB interface 102 may be routed internally along internal data paths or data and control signal paths, such as a data bus, to various internal functional modules of printer 100 as determined by control logic in printer 100. In some embodiments, data transmitted to printer 100 by computer 200 may also include destination addresses and/or commands to facilitate routing.

In some embodiments, CPU 103, memory 104, control block 105, decompressor module 106 with attached RAM, PWM logic module 107, and driver circuit 108 may be coupled using the data bus. Data received by USB interface 102 may be placed in memory 104 under the control of the CPU 103, according to some embodiments of the present invention. Decompressor 106 and attached RAM may also be coupled to PWM logic module 107. In some embodiments, decompressor module 106 may receive compressed image data, decompress the received image data, store the decompressed data in RAM, and send the data to PWM logic module 107.

Various data and control signal paths may couple PWM logic module 107, driver circuit 108, printhead 109, mechanical controller 123, beam detect sensor 112, and transfer belt position sensor 125. In some embodiments, printhead 109 may be a laser printhead. In some embodiments, beam detect sensor 112 may generate a start of scan (SOS) or "hsync" signal for each scan line in an image, or for a set of scan lines in an image, and send the generated signal to mechanical controller 123, which then sends the signal to PWM logic module 107.

Driver circuit 108 may be communicatively coupled to PWM logic module 107 and printhead 109. In some embodiments, scanning mirror 110 may be mechanically or electromagnetically coupled to scanning motor 111, which may be used to rotate scanning mirror 110. Each laser beam from printhead 109 may be transmitted to scanning mirror 110, and scanning mirror 110 may reflect that beam at different times to beam detect sensor 112 and optical system 113, which may include a cylindrical lens, an f-theta lens, a guide lens, and so on. Optical system 113 may guide laser beams from scanning mirror 110 to photosensitive drums 114. Drum charger 116 may be used to charge photosensitive drum 114. Although only one set comprising scanning mirror 110, scanning motor 111, and beam detect sensor 112 has been illustrated in FIG. 1, four sets of scanning mirror 110, scanning motor 111, beam detect sensor 112, and optical system 113 may be provided—one set for each of the four laser beams, respectively. In this case, each beam detect sensor 112 can generate an SOS signal.

In some embodiments, each latent image formed on photosensitive drum 114 may be developed with a toner at developing station 115 before transferring to paper 175. Paper 175 may be passed from paper input tray 126 through transfer rollers 124 to transfer belt 117, where toner images developed at developing stations 115 and accumulated on transfer belt 117 may be transferred to paper 175. After the image has been transferred, paper 175 may be moved over paper path 118 using transfer rollers 124 and past fuser 119, guide rollers 121, and to paper output tray 122. In some embodiments, fuser 119 may facilitate the fixing of the transferred image to paper 175.

In an exemplary embodiment, printer 100 may include a printer controller 180 and a printer engine 190. Printer controller 180 may be configured to process image data received from computer 200 via connection 120, and send the processed data to print engine 190 for printing. Printer controller 180 of printer 100 may include, among other things, a USB interface 102, a CPU 103, a memory 104, a control block 105, at least one decompressor module 106 with attached random access memory ("RAM"), at least one pulse width modulation ("PWM") logic module 107, and at least one driver circuit 108. Exemplary printer engine 190 of printer 100 may include beam detect sensor 112, optical system 113, developing station 115, photosensitive drum 114, drum charger 116, scanning mirror 110, scanning motor 111, and printhead 109. The various modules and subsystems described above may be implemented by hardware, software, or firmware or by various combinations thereof.

In some embodiments, computer 200 may send image data to printer controller 180 over connection 120. The image data sent from the computer 200 may be compressed. In some embodiments, the compressed image data may be in a line-sequential compressed format. After the image data is received by USB interface 102, the image data may be placed in memory 104 under the control of CPU 103. In some embodiments, a print sequence may be initiated when image data for some portion of the page has been stored in memory 104. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses (SOS signals) that are sent to printer controller 180 so that image data can be properly aligned from line to line in a printed image. In some embodiments, at the beginning of a scan of each line of the image, light from the printhead 109 may be reflected by scanning mirror 110 onto beam detect sensor 112. Beam detect sensor 112 may signal mechanical controller 123 which, in turn, may send an SOS signal to PWM logic module 107. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, in some embodiments, a TOD signal may be sent to PWM logic module 107 via mechanical controller 123. Once the TOD signal is received, CPU 103 may initiate a transfer from memory 104 to de-compressor module 106. In some embodiments, decompressor module 106 may decompress image data and pass the resulting raw image data to PWM logic module 107. The resultant PWM pulses from PWM logic module 107 may then be streamed to driver circuit 108, which may then transmit the PWM pulses to printhead 109.

In some embodiments, laser beam from printhead 109 may be modulated and reflected off scanning mirror 110 and optical system 113, causing a latent image of charged and discharged areas to be built up on photosensitive drum 114. In some embodiments, toner develops this latent image at the developing station 115 and the toner image may be transferred to transfer belt 117. For a multi-component image, such as a color image, the latent image building process may repeat for each of the components. For example, for CMYK color printers, which use cyan ("C"), magenta ("M"), yellow ("Y"), and black ("K") toners for instance, the latent image building process on photosensitive drum 114 may be repeated for each of the colors C, M, Y, and K. Toner images for all four colors may be accumulated on transfer belt 117 before a complete toner image is transferred to the page at transfer roller 124.

In some embodiments, in sync with the timing when all components have been assembled on transfer belt 117, paper 175 may be fed from paper input tray 126 to transfer roller 124 where the image may be further transferred to paper 175. Fuser 119 may then fix the toner to paper 175, which is sent to paper output tray 122 using guide rollers 121. In some embodiments, the rate that the images are transferred to paper 175 (i.e., the print speed) may be determined by the rotational speed of transfer belt 117. For example, once the rotational speed is set for the transfer belt 117, the print speed may become constant and any delay in image data transfer to print engine 190 may cause video under-runs, and the page may not be printed properly.

A pixel clock generation module (not shown) may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module may be fixed among each pass of the printer. In an example multi-pass printer 100, the pixel clock generation module may be a crystal oscillator. In another embodiment, such as a printer 100 that uses multiple sets of printer engine 190, sometimes collectively referred to as a "tandem engine", the frequency of each channel may be calibrated if the frequencies differ among the pixel clocks corresponding to each of the color components. In such embodiments, one or more programmable clock oscillators may be used to allow calibration.

Exemplary embodiments of printer 100 may include driver circuit 108 driving multiple sets of printer engine 190, which may be connected to multiple printheads 109. In some embodiments, printheads 109 could all be laser printheads. There may also be a plurality of individual modules of printer controller 180. For example, a single de-compressor module 106 may be connected to multiple PWM logic modules 107, with each PWM module 107 being connected to one or more pixel clock generation modules and one or more driver circuits 108. De-compressor module 106 and attached RAM could provide each PWM logic module 107 with one or more color components of an image, which would then be sent to the multiple driver circuits 108 for onward transmission to one or more sets of printer engine 190.

In other embodiments, multiple decompressor modules 106 may be coupled to multiple PWM logic modules 107. Each decompressor module 106 may provide a PWM logic module 107 with a decompressed component of the image. For example, for a multi-component image in CMYK color space, which contains cyan ("C"), magenta ("M"), yellow ("Y"), and black ("K") image components, each individual image component may be processed by each de-compressor module 106 and sent down to each corresponding PWM logic module 107 in a parallel manner.

In some embodiments, printer 100 may have multiple lasers per laser printhead 109. In some embodiments, printhead 109 may receive multiple lines of data from driver circuit 108 and project the multiple lines of data to scanning mirror 110. Scanning mirror 110 may then reflect the multiple lines of data to beam detect sensor 112 and optical system 113, which may reflect the multiple lines to photosensitive drum 114. In some embodiments, the beam detect sensor 112 may detect a signal, such as a laser signal, reflected off of the scanning mirror 110, or may also detect multiple signals reflected off scanning mirror 110.

Each of the logical or functional modules described above for printer 100 may comprise multiple modules. The modules may be implemented individually or their functions may be combined with the functions of other modules. Further, each of the modules may be implemented on individual components, or the modules may be implemented as a combination of components.

Exemplary computer 200 may be a computer workstation, desktop computer, laptop computer, or any other computing device capable of being used with printer 100. In some embodiments, exemplary computer 200 may include, among other things, a processor 280, a memory 281, and a USB interface 282. Processor 280 may be a central processing unit ("CPU"). Depending on the type of computer 200 being used, processor 280 may include one or more printed circuit boards, and/or a microprocessor chip. Processor 280 may execute sequences of computer program instructions to perform various processes that will be explained later. The computer program instructions may be accessed and read from memory 281, or any other suitable memory location, and be executed by processor 240. Memory 281 may be any type of Dynamic Random Access Memory ("DRAM") such as, but not limited to, SDRAM, or RDRAM.

In one exemplary embodiment, a USB interface 282 may be included in computer 200 as an interface to send and receive data via a serial pipe. For example, USB interface 282 may be coupled to processor 280 to receive data to be printed and send the data to printer 100 via connection 120. It is contemplated that other interfaces may also be used to send data via other types of connection 120, such as, for example, parallel port, FIREWIRE or wireless interfaces.

When a full page of image data can be transferred from computer 200 to printer 100 at a speed higher than, or at least equal to, the print speed of printer 100 then data under-runs will not occur. A color data compression application, such as a color data resolution switching application, may be included in computer 200 to appropriately reduce the size of the color image data, so that the image data transfer rate does not exceed the bandwidth of connection 120. In some embodiments, the resolution switching application may run on computer 200. It is also contemplated that the resolution switching application may be stored on a removable computer readable medium, such as a hard drive, computer disk, CD-ROM, DVD ROM, CD±RW or DVD±RW, USB flash drive, memory stick, or any other suitable medium.

In some embodiments, image data may be divided into blocks termed image blocks, which can be as small as individual lines of the image. Color images are normally represented in a color space comprising of component color planes. For example, the CMYK color space may comprise of cyan ("C"), magenta ("M"), yellow ("Y"), and black ("K") color planes. For color image data, an image block may comprise color blocks corresponding to the constituent color components of the color image. Consistent with disclosed embodiments, a print frame refers to the set of color blocks corresponding to the same region of the image. During the printing process, toner images of the color blocks in a print frame may be printed in the same region on the print medium. For example, in a CMYK color printers, each print frame may comprise of color blocks corresponding to the C, M, Y, and K component color planes. CMYK printers get their name from the use of the cyan ("C"), magenta ("M"), yellow ("Y"), and black ("K") color planes to represent color data. On the other hand, a transfer frame refers to a set of color blocks that are transferred together. In some embodiments, these color blocks may share a portion of the bandwidth offered by connection 120.

In some color printers, color blocks corresponding to the constituent color planes of a single print frame may be offset with respect to each other when they are transferred. Thus, a color block for one color plane in a print frame may be transferred with a physical offset to a color block for another color plane in the same print frame. As a result, at various points during the printing process a transfer frame may include less than the entire set of color planes so that a proportionally higher bandwidth may be available for each sub-channel.

Figure 2:
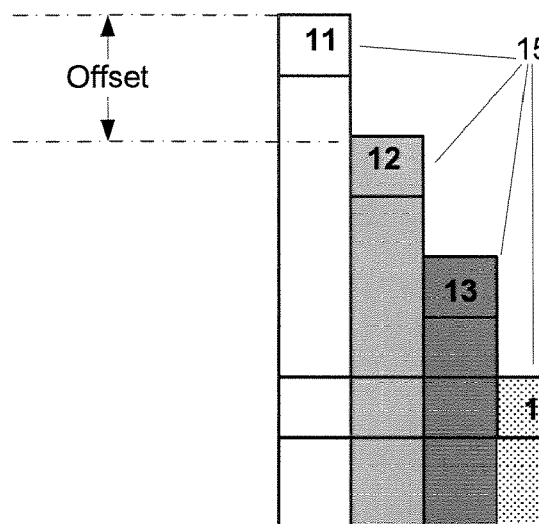
FIG. 2 is an illustration of physical offsets among color planes on an exemplary printer.
Figure 2:
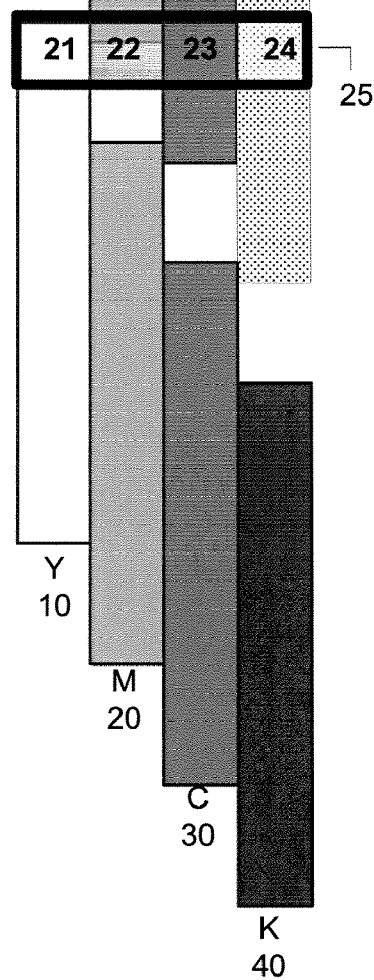

FIG. 2 illustrates physical offsets among color planes for an exemplary printer 100. As shown in FIG. 2, for exemplary CMYK color printer 100, which uses cyan ("C"), magenta ("M"), yellow ("Y"), and black ("K"), color image data of Y-plane 10 may start transferring first, followed by image data of M-plane 20, C-plane 30 and K-plane 40. For example, a 70 mm physical offset may occur between any two adjacent color planes. Accordingly, image data of M-plane 20 may not start transferring until the first 70 mm image data of Y-plane 10 are transferred.

For example, print frame 15 at the beginning of print page 1 is shown in FIG. 2. Exemplary print frame 15 may comprise color block 11 of Y-plane 10, color block 12 of M-plane 20, color block 13 of C-plane 30, and a color block 14 of K-plane 40. Color blocks 11-14 correspond to the same region of a print page, but may be offset with respect to each other during transfer.

Examples of transfer frame 25 are also shown in FIG. 2. Transfer frame 25 comprises color blocks 21 through 24 that are transferred during the same time interval. When a print job includes multiple printed pages, such as page 1 and page 2, color blocks from different pages may also be in the same transfer frame. For example, FIG. 2 shows transfer frame 25 in the transitional region of page 1 and page 2. Transfer frame 25 may comprise color block 21 of Y-plane 10, color block 22 of M-plane 20, color block 23 of C-plane 30, and color block 24 of the K-plane 40. Since Y-plane 10 starts transferring data before other color planes, color block 21 may contain image data solely of page 2. Color block 22 may contain a bottom portion of M-plane image data of page 1 and a blank portion that corresponds to the bottom and/or top margin of page 2. Due to the additional offset of C-plane 30 and K-plane 40, color block 23 and color block 24 contain image data solely of page 1.

When transfer frame 25 is transferred from computer 200 to printer 100, the bandwidth of connection 120 may be shared by color blocks that constitute transfer frame 25. For example, the bandwidth of connection 120 may be shared by color blocks 21-24. Depending on the position of the transfer frame, the frame may not include color blocks from all the color planes, and accordingly, the bandwidth available for a color sub-channel may be increased proportionately. For example, when the first 70 mm image data of Y-plane 10 is being transferred, the transfer frame includes only one color plane (Y-plane 10), which may use the entire bandwidth of connection 120 for some time period.

In some print tasks, different print pages or different regions of the same print page may contain different image content, such as color pictures and black-and-white texts. Image data representing color pictures may have a larger data size than image data representing text. Due to the physical offsets of the various color planes, it may be possible that a color block corresponding to a color picture may share the bandwidth with a color block corresponding to a text region. As a result, large sized color blocks may now be spread across several different transfer frames. Consequently, the color blocks that would have otherwise exceeded available bandwidth may now be accommodated because they each share bandwidth with smaller sized color blocks (instead of each other).

Figure 3:
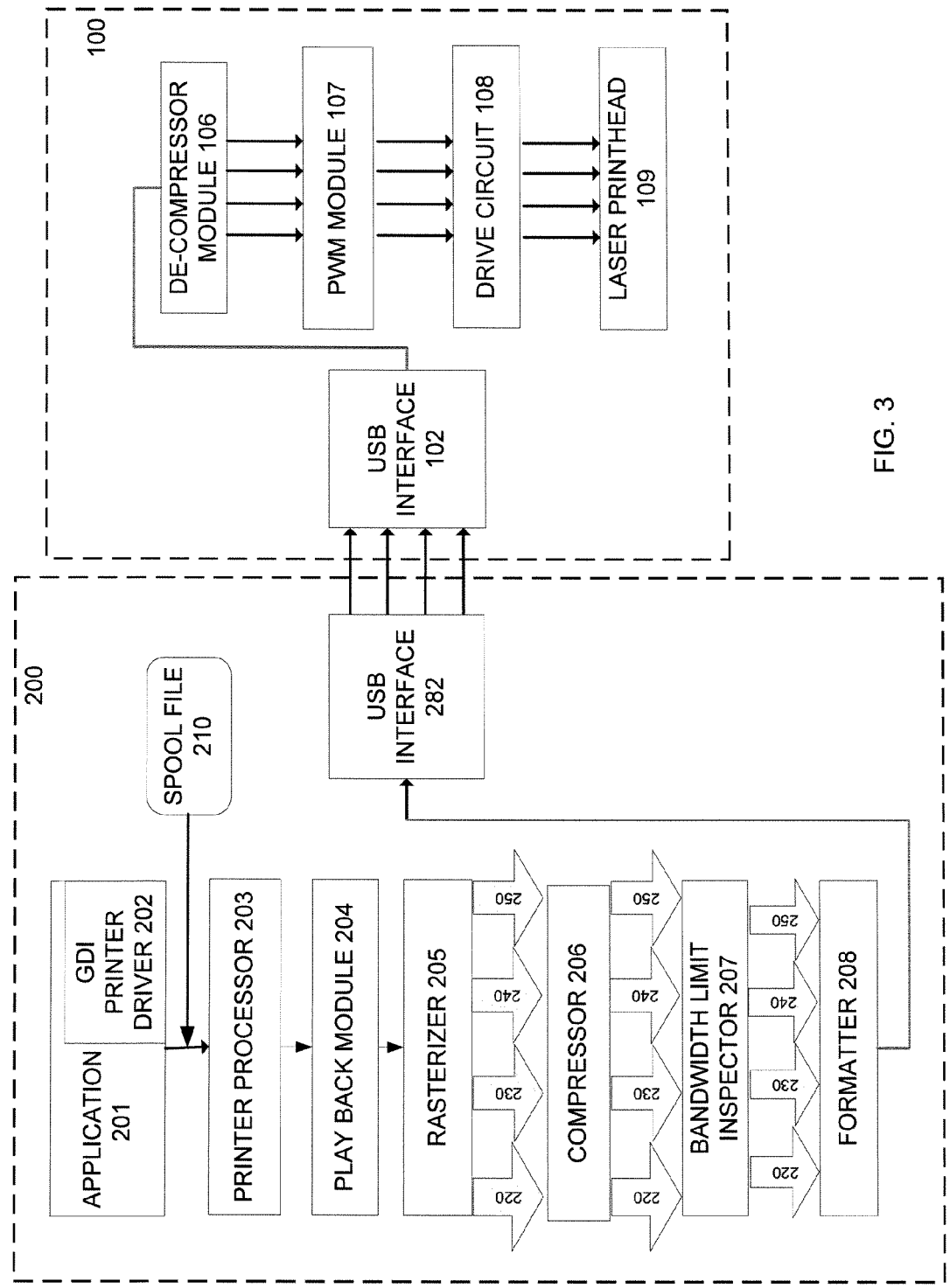
FIG. 3 shows a block diagram indicating an exemplary data flow between an exemplary computer and an exemplary printer for color data compression.

FIG. 3 shows a block diagram indicating an exemplary data flow between an exemplary computer and an exemplary printer for color data compression. In an exemplary embodiment, a print job may be initiated by an application 201 running on computer 200. For example, application 210 may use a graphic device interface ("GDI") and printer driver 202 to generate a description of the print job. The description may include the image data to be printed, such as a letter or a picture, and formatting and printing instructions that form the image data into a properly printed page. In some embodiments, application 201 may use GDI and printer driver 202 to format the description in the form of meta data and generate a print spool file 210.

The size of the image data may vary depending on the number of color planes associated with the data and the resolution of the image. In some embodiments, the image data may include multiple components associated with multiple color planes. For example, the image may be in a CMYK color space and may contain cyan ("C"), magenta ("M"), yellow ("Y"), and black ("K") image components. Each image component may be processed and/or transferred one after another, or in a parallel manner. In some embodiments, the formatting and printing instructions may be created and stored as a header file of print spool file 210. The size of the header file may be relatively constant among various print jobs.

In some embodiments, the generated print spool file 210 may be sent to a printer processor 203 on computer 200. Printer processor 203 may perform tasks such as collating on print spool file 210 before it is sent off to a playback module 204 for playback. In some embodiments, playback module 204 may create a list of simple objects that can be rasterized by rasterizer 205, based on the GDI description in print spool file 210.

Print spool file 210 may then be sent to a rasterizer 205. Rasterizer 205 may be configured to transform the image data in print spool file 210 into bitmap data. Rasterizer 205 may further include a frame buffer that contains rasterized bitmap data. In some embodiments, rasterizer 205 may transform the image data in portions, when the size of the image data is relatively large. In some embodiments, computer 200 may include a plurality of rasterizers configured to rasterize color data into a plurality of bitmaps. For example, as shown in FIG. 2, rasterizer 205 may be able to rasterize C-plane color data 220, M-plane color data 230, Y-plane color data 240, and K-plane color data 250 in parallel. In some embodiments, rasterizer 205 may include sub-rasterizer modules corresponding to individual color planes, where each sub-rasterizer module may operate on data in its respective color plane.

Consistent with one embodiment of the present disclosure, rasterizer 205 may be further configured to compute a lower resolution image and a delta image for image data in each color plane. For example, the original image data in print spool file 201 may have a resolution of 600 dpi. Rasterizer 205 may compute a lower resolution image that have a resolution of 480 dpi and a delta image that represents the difference information between the original image and the lower resolution image. In some embodiments, the delta image may include a portion of the original high resolution image data. In some embodiments, the delta image can be used to recover the original higher resolution image when used in conjunction with the lower resolution image. The computation used to compute the delta image may be mathematically reversed to reconstruct the original image from the lower resolution image and the delta image.

In some embodiments, resolution may be reduced in only one physical dimension. For example, resolution may be reduced only in the main scanning direction (i.e., perpendicular to the direction in which paper is fed to a printer) so that the image data transfer rate keeps up with print speed. For example, if paper is fed to the printer along its length (i.e. vertically) then resolution may be reduced in the horizontal direction. In some embodiments, resolution may be reduced in both dimensions (horizontal and vertical). Various algorithms may be used to compute the lower resolution image and the delta image, such as applying low-pass and high-pass filters to the original image.

Rasterized image data (bitmap data) may be compressed by compressor 206. Compression may reduce the size of the image data, and therefore reduce the bandwidth for transferring the image data. In some embodiments, compressor 206 may use lossless compression methods such as, for example, JBIG and GIF compressions, so that the image may be reconstructed without loss in quality by decompression at decompressor module 106. When lossless compression is used, the image quality may be preserved through the compression and decompression process. However, a high compression ratio cannot always be guaranteed for lossless compressions. For example, images containing high resolution details may not always compress well, i.e., the size of the compressed image may sometimes be comparable to the size of the original image before compression.

In some other embodiments, compressor 206 may use lossy compression methods such as, for example, JPEG and wavelet compressions. Using lossy compression may yield higher compression ratios on average than lossless compression, but reconstruction of the original image from the compressed data may incur some loss of information. In some embodiments, compressor 206 may also be configured to use a combination of various compression algorithms. For example, compressor 206 may also be configured to use a combination of lossless compression and lossy compression to achieve a balance between image quality and compression ratio.

In some embodiments, computer 200 may include a plurality of compressors configured to compress color data in the color planes. For example, as shown in FIG. 2, compressor 206 may include four sub-compressors for compressing C-plane color data 220, M-plane color data 230, Y-plane color data 240, and K-plane color data 250 in parallel. In some embodiments, the same compression algorithm and parameters may be applied to color data in all the color planes.

Compressed color data may be passed from compressor 206 to a bandwidth limit inspector 207. Bandwidth limit inspector 207 may be configured to determine if the bitmap image can be sent across connection 120 without exceeding the bandwidth of connection 120. In some embodiments, bandwidth limit inspector 207 may make its determination on a transfer frame by transfer frame basis, depending on the size of the buffers in printer controller 180 and/or on the granularity of the resolution switching scheme. For example, for the smallest granularity, the transfer frame may be a line of the bitmap image. Each transfer frame may include a plurality of compressed color blocks.

Due to the physical offsets among color planes, compressed color blocks in the same print frame may not be transferred via connection 120 at the same time. Instead, one compressed color block in a first print frame may share bandwidth with another compressed color block in a second print frame. In some embodiments, bandwidth limit inspector 207 may determine compressed color blocks that constitute a transfer frame.

As a first step, for a given transfer frame, bandwidth limit inspector 207 may determine the color planes involved in the transfer frame. For example, for CMYK color printers, which use cyan ("C"), magenta ("M"), yellow ("Y"), and black ("K"), image data transfer may start from Y-plane 10, followed by M-plane 20, C-plane 30, and K-plane 40 with a physical offset of 70 mm between the transfer of two successive color planes. Therefore, for the duration of the 70 mm offset, image data transferred via connection 120 may correspond to Y-plane data. For the duration of the next 70 mm offset, image data transferred may correspond to Y-plane and M-plane data. During the period associated with the next 70 mm offset, image data transferred may correspond to Y-plane, M-plane, and C-plane data. After a duration corresponding to a 210 mm offset from the start of Y-plane data, transfer frames may contain image data of all four color planes.

As a second step, bandwidth limit inspector 207 may determine if there are compressed color blocks present in the transfer frame. For example, if bandwidth limit inspector 207 determines that all C, M, Y, K planes are involved in transfer frame 25, bandwidth limit inspector 207 may further determine that transfer frame 25 contains a compressed K-plane color block 24, a compressed C-plane color block 23 offset by 70 mm from color block 24, a compressed M-plane color block 22 offset by 70 mm from color block 23, a compressed Y-plane color block 21 offset by another 70 mm from color block 22.

In some embodiments, bandwidth limit inspector 207 may then inspect the transfer frame and determine the cumulative size of the compressed color blocks for all color planes in the transfer frame. Bandwidth limit inspector 207 may then compare the cumulative data size with a data-size threshold. According to one embodiment, the data-size threshold may be determined based on the print speed of printer 100 and the bandwidth of connection 120. In some embodiments, bandwidth limit inspector 207 may tag one or more compressed color blocks in transfer frame 25 for resolution reduction, if transfer frame 25 has a data size that is larger than the data-size threshold. Resolution reduction of the tagged color blocks may be performed later by formatter 208.

In some embodiments, bandwidth limit inspector 207 may compare the data size of the compressed block in each color plane with a sub-channel data-size threshold. The sub-channels correspond to the color planes. In one embodiment, the sub-channel data-size threshold for a color plane may be determined based on the print speed of printer 100 and the sub-channel bandwidth allocated to the color plane. Sub-channel bandwidth is inversely proportional to the number of color blocks in a transfer frame. For example, if connection 120 has a bandwidth of 60 M bytes per second, a bandwidth of 15 M bytes per second may be allocated to each sub-channel if the transfer frame includes four color blocks. On the other hand, if the transfer frame includes two color blocks, the sub-channel bandwidth can be 30 M bytes per second. In some embodiments, bandwidth limit inspector 207 may tag a compressed block in the transfer frame for resolution reduction, if the respective data size of the compressed block is larger than the sub-channel data-size threshold.

Compressed color image data may be further passed from bandwidth limit inspector 207 to a formatter 208. Formatter 208 may be configured to accumulate one full image in memory before passing it to USB interface 282 and transferring to printer 100. Consistent with disclosed embodiments, formatter 208 may be further configured to examine if a color block received from bandwidth limit inspector 207 is tagged. If a color block is tagged, formatter 208 may remove the delta image block that is associated with the tagged color block.

In some embodiments, formatter 208 may discard delta image blocks for all color planes in a print frame, if a color block corresponding to any one color plane in that print frame is tagged. For example, on a CMYK color printer, formatter 208 may examine print frame 15 that contains color blocks 14-17 corresponding to K, Y, M, C planes respectively. If one of these color blocks is tagged, print frame 15 is considered as tagged, and formatter 208 may discard delta image blocks for the C, M, Y, and K colors.

To avoid unsightly resolution transitions in the middle of highly detailed images, such as photographs, in some embodiments, formatter 208 may be further configured to grow a non-transition region from a color block that is tagged until a "safe-transition" color block is reached. The non-transition region may be a region not suitable for resolution transitions. For example, the non-transition region may include high resolution details of the image, or may be a data intensive portion of the image. In some embodiments, the resolution of each color block in the non-transition region is reduced. A safe-transition color block may contain relatively low-resolution image information such that reducing the image resolution may not affect the visual quality of the image and thus, a resolution transition may not be noticeable by human eyes. For example, a region where there is only white space (blank space) or solid colors may be suitable for resolution transition.

The non-transition region may include at least one color block. For example, the color block that is tagged may be included, along with a set of contiguous color blocks. In some embodiments, formatter 208 may be configured to grow the non-transition region by including color blocks adjacent to one edge of the region, if this adjacent color block is not a safe-transition block. Once safe-transition color blocks are reached on both ends of the region, formatter 208 may stop growing the region and remove delta image blocks associated with the entire non-transition region.

For a color block that is neither tagged nor included in a region grown from a tagged block, formatter 208 may reconstruct the color block based on the corresponding portions of the compressed lower resolution image and the compressed delta image. Formatter 208 may then buffer one full image in the memory, and the buffered image can include color blocks of reduced resolution and color blocks of original resolution. Formatter 208 may transfer the buffered image across connection 120 using USB interfaces 102 and 282.

In some embodiments, the compressed image data may be decompressed by de-compressor module 106 using decompression algorithms. For example, if JBIG compression is used by compressor 206, the JBIG decompression may be used by de-compressor module 106. When a lossy compression is used by compressor 206, decompression may not exactly reconstruct the image data as in print spool file 210.

In some embodiments, de-compressor module 106 may pass the decompressed image data to PWM logic module 107. The resultant PWM pulses from PWM logic module 107 may then be streamed to driver circuit 108, which may then transmit the PWM pulses to printhead 109. In some embodiments, PWM logic module 107, therefore, may be construed to be able to dynamically switch itself in either a high resolution mode (for 600-dpi-driving) or a low resolution mode (for 480-dpi-driving) color block by color block basis. Any conventional method or mechanism may be deployed for switching of the operation mode of PWM logic module. Accordingly, images may be decompressed color block by color block and may have differing resolutions. For example, one color block may have a resolution of 480 dpi, while another color block may have a resolution of 600 dpi.

Figure 4:
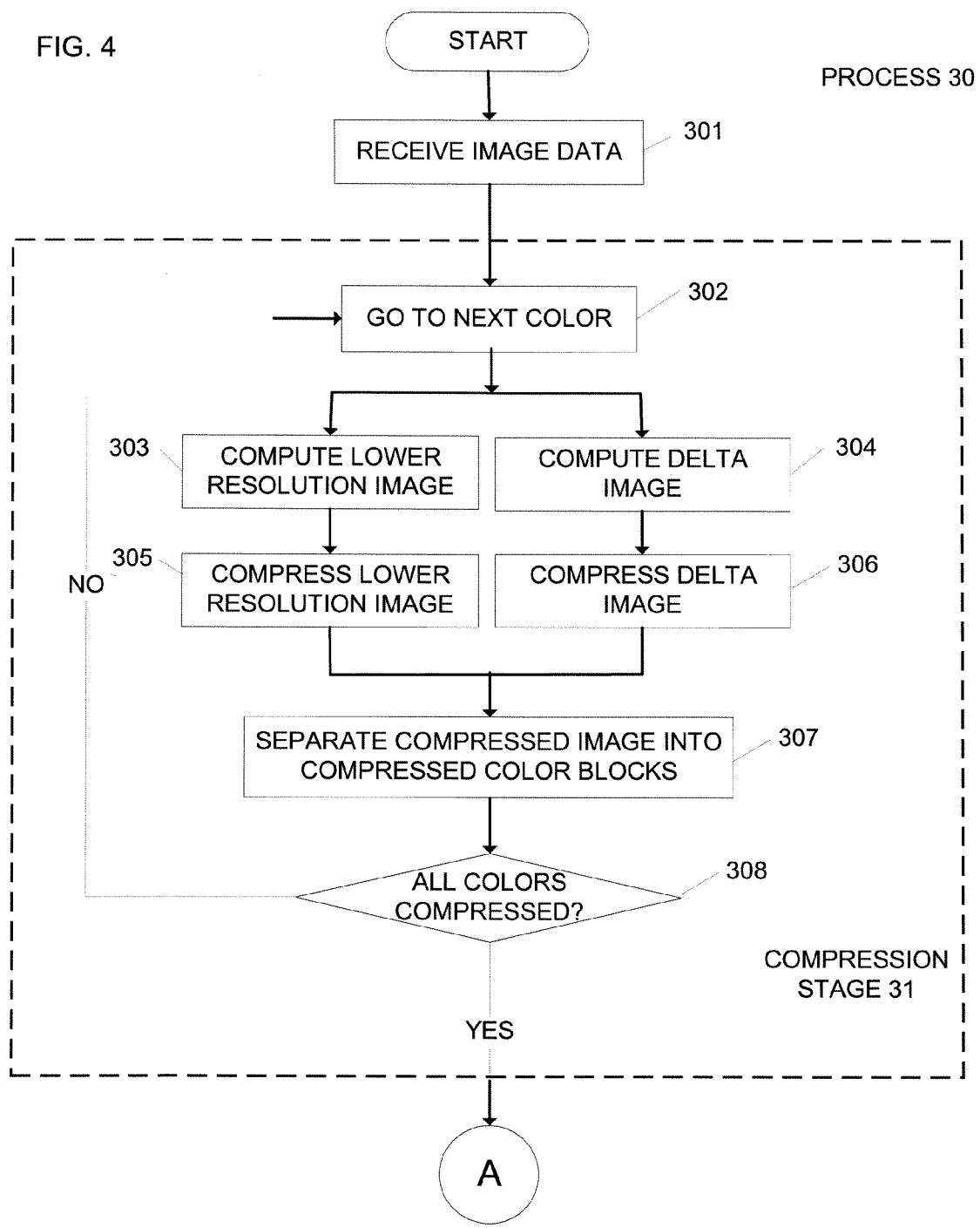
FIG. 4 shows a flow chart of an exemplary color data compression operation process.
Figure 4:
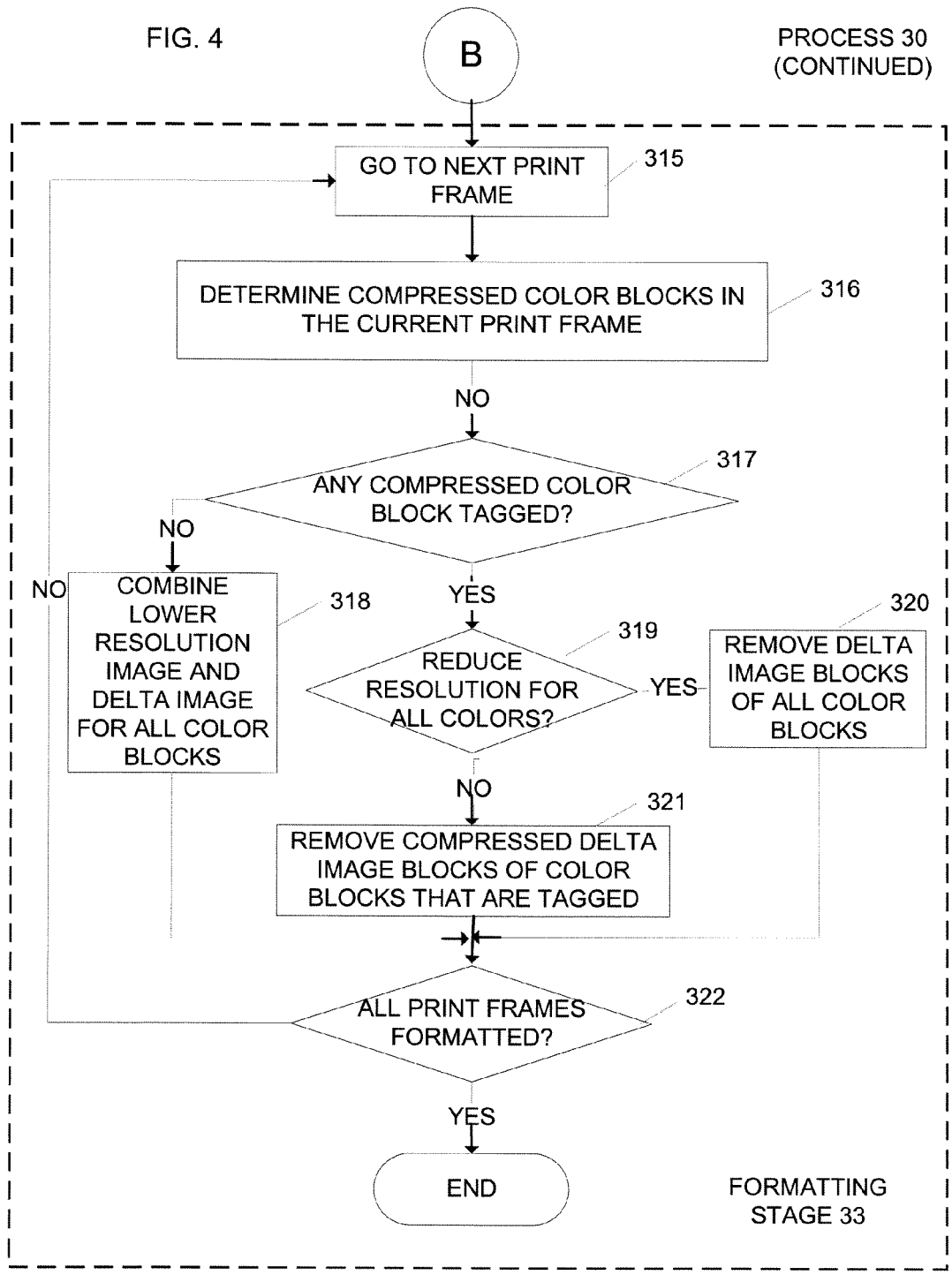

FIG. 4 shows a flow chart of an exemplary resolution switching operation process 30 according to the disclosed embodiments. The algorithm described in FIG. 4 may also be applied to various other types of printing systems such as, for example, copiers and multi-function devices, with appropriate modifications specific to the device and in a manner consistent with embodiments disclosed herein. The algorithm described in FIG. 4 may further be used in conjunction with various software applications to perform resolution switching.

In step 301, image data may be received. For example, application 201 may generate a print spool file 210 that contains print image data and printing instructions, and print spool file 210 may be received by printer processor 203 from application 201. In some embodiments, the image data may include multiple components associated with multiple color planes.

Compression stage 31 of process 30 may comprise steps 302-308. In step 302, image data of the first or next color plane may be compressed. Based on the image data, a lower resolution image may be computed in step 303 and a corresponding delta image may be computed in step 304 for the current color plane. For example, rasterizer 205 may compute the lower resolution image and the delta image for the image data in print spool file 210. For example, a lower resolution image with a resolution of 480 dpi may be computed from an original image with a resolution of 600 dpi. A corresponding delta image may also be computed simultaneously. The delta image may represent difference information between the original image and the lower resolution image. The computation of delta image may be mathematically reversed to reconstruct the original image from the lower resolution image and the delta image.

After the lower resolution image and the delta image are computed in step 303 and 304, both images may be compressed in step 305 and step 306. For example, the images may be compressed by compressor 206. Compression may further reduce the size of the images. For example, compressor 206 may use lossless compression methods, so that the image may be reconstructed without loss when decompressed.

In step 307, the image of the current color plane may be separated into color blocks. In some embodiments, the granularity of the color blocks may be as small as individual lines of the image for the current color plane. In step 308, it may be determined whether all the color planes have been processed by the computer. If there is still at least one color plane of the print image left unprocessed, the algorithm may go back to step 302 and process the next color plane. The algorithm can iterate through steps 302-318 until all the color planes have been compressed, after which, compression stage 31 may conclude.

In some embodiments, bandwidth limit inspection stage 32 may begin after the images are compressed. In bandwidth limit inspection stage 32, it may be determined if a transfer frame can be sent across connection 120 without exceeding the available bandwidth of connection 120. In step 309, the first or the next transfer frame may be inspected.

In some embodiments, in step 309, compressed color blocks of all colors that are in the current transfer frame may be determined. Due to the physical offsets among color planes, the compressed color blocks in the current transfer frame may not be in the same print frame as each other. Instead, the compressed color block of one color in a first print frame may share the transfer bandwidth with compressed color block of another color in a second print frame.

In some embodiments, bandwidth limit inspector 207 may determine compressed color blocks of all color planes in the current transfer frame. As a first step, bandwidth limit inspector 207 may determine the color planes involved in the current transfer frame. In the example shown by FIG. 2, bandwidth limit inspector 207 may determine that a transfer frame contains image data only of Y-plane 10, if the transfer frame is within the first 70 mm of page 1. Bandwidth limit inspector 207 may determine that a transfer frame contains image data of Y-plane 10 and M-plane 20, if the transfer frame is within the 70 mm-140 mm range of page 1, and that a transfer frame contains image data of Y-plane 10, M-plane 20, and C-plane 30, if the transfer frame is within the 140 mm-210 mm range of page 1. For a transfer frame, such as transfer frame 25, that is lower than 210 mm of page 1, bandwidth limit inspector 207 may determine that the transfer frame may contain image data of all the four color planes.

As a second step, bandwidth limit inspector 207 may determine which compressed color blocks are contained in a transfer frame. For example, if it is determined that the transfer frame contains all the color planes, bandwidth limit inspector 207 may further determine that the transfer frame contains color blocks 21-24, each offsetting for 70 mm from its adjacent color block, as shown in FIG. 2. In some embodiments, bandwidth limit inspector 207 may determine an offset by dividing the physical offset by the length of the color block. For example, if the length of color block 15 is 10 mm and the physical offset is 70 mm, then the color block offset can be calculated as being 7 color blocks.

If the print task includes multiple pages, an extrapolated page may be formed by stacking the pages. Consistent with the present disclosure, "stacking" two pages refers to placing the second page right after the first page, so that the top of the second page engages the bottom of the first page. After the multiple pages are stacked to form the extrapolated page, similar methods as described above for a single page may be used to determine the compressed color blocks in a transfer frame for the extrapolated page.

In some embodiments, in step 311, the cumulative size of compressed color blocks in the current transfer frame may be determined. For example, total pixel count of compressed color blocks, including their respective lower resolution image blocks and delta image blocks, may be determined by bandwidth limit inspector 207. In step 312, the total data size may be compared with some pre-determined threshold. According to one embodiment, the threshold may be determined based on the print speed of printer 100 and the bandwidth of connection 120.

In step 312, if the total data size exceeds the threshold, one or more compressed color blocks in the current transfer frame may be tagged with a delta removal flag in step 313. In some embodiments, the delta removal flag may indicate that the delta image block corresponding to the compressed color block tagged should be removed.

In some embodiments, alternative algorithms may be used for steps 311-313 shown in FIG. 4. For example, bandwidth limit inspector 207 may determine data size of each compressed color block in the current transfer frame, in step 311. Bandwidth limit inspector 207 may then compare the data size of each compressed color block with a corresponding sub-channel threshold for that color plane, in step 312. In step 313, the compressed color block in the transfer frame may be tagged with a delta removal flag, if the respective data size of the compressed color block is larger than the sub-channel threshold.

In step 312, if the total data size does not exceed the threshold, step 313 may be skipped and process 30 may proceed directly to step 314. In step 314, it may be determined whether all the transfer frames have been inspected. If there is still at least one transfer frame left uninspected, the algorithm may go back to step 309 and inspect the next transfer frame. The algorithm can iterate through steps 309-314 until all the transfer frames have been inspected. For example, bandwidth limit inspector 207 may go through each transfer frame in the image.

A formatting stage 33 may begin after all the transfer frames in the image are inspected and properly tagged. For example, formatting stage 33 may accumulate a full image before the image is sent to a printing device. In some embodiments, formatting may also be done on a color block by color block basis. In step 315, the first or next print frame may be accessed. In step 316, compressed color blocks of all colors in the current print frame may be determined. In the example shown by FIG. 2, bandwidth limit inspector 207 may determine that print frame 15 contains color blocks 11-14. In step 317, it may be determined if a delta removal flag is associated with any compressed blocks in the current print frame.

In step 317, if the delta removal flag has not been set for any of the color planes in the current print frame, no resolution reduction may be performed. Accordingly, in step 318, the compressed color blocks may be reconstructed based on the corresponding portions of the lower resolution image and the delta image. If in step 217 the delta removal flag has been set for at least one color plane in the current printing frame, a determination whether resolution should be reduced for all the color planes can be made in step 319. In some embodiments, reduction of resolution in all color blocks of the current print frame may be desired so that the visual quality of the image may not be degraded. For example, if the print frame is in a region where there is a full color picture with a lot of details, resolution reduction in all color blocks may be desired. As another example, resolution reduction may be limited to tagged color blocks if the print frame is in a region where there is only white space (blank space) or solid colors.

If the resolutions of all the color blocks are to be reduced in the current print frame, the delta image blocks corresponding to all the compressed blocks may be removed in step 320. Otherwise, if only the resolutions of tagged color blocks are to be reduced, the delta image blocks corresponding to tagged color blocks may be removed in step 321.

After step 321, it may be determined whether all the print frames have been formatted in step 322. If there is still at least one print frame of the image left unformatted, the algorithm may go back to step 315 and format the next print frame. The algorithm can iterate through steps 315-322 until all the print frames have been formatted, after which exemplary process 30 may terminate.

Various algorithms may be used to tag one or more compressed color blocks in a transfer frame, such as in step 313 of process 30. For example, the two exemplary processes which may be implemented by bandwidth limit inspector 207 for tagging the compressed blocks are shown in FIG. 5.

Figures 5A, 5B:
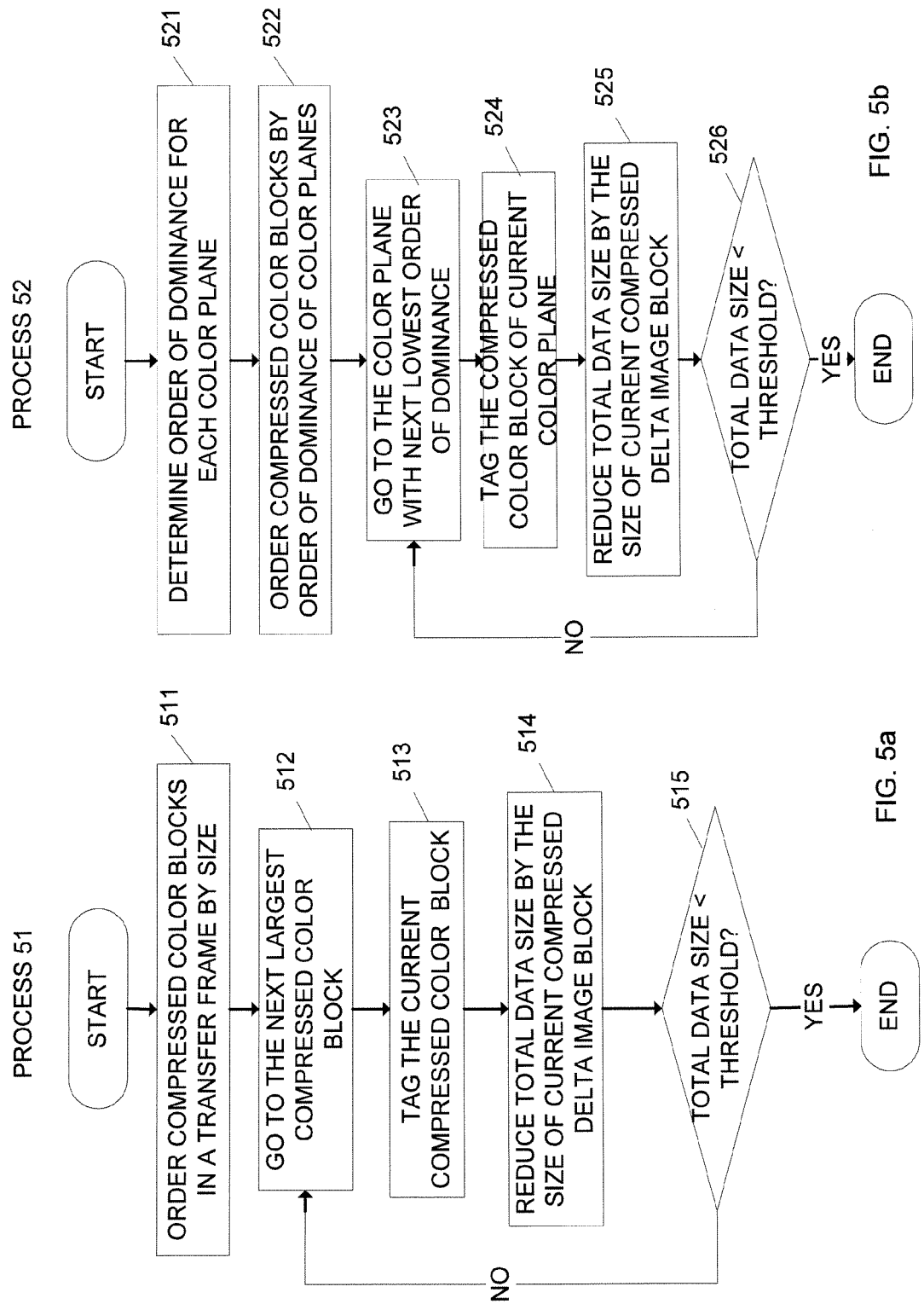
FIG. 5a shows a flow chart of a first exemplary operation process for tagging color blocks for resolution reduction.
FIG. 5b shows a flow chart of a second exemplary operation process for tagging color blocks for resolution reduction.

FIG. 5a shows a flow chart of a first exemplary operation process 51 for tagging the compressed color blocks. In exemplary process 51, compressed color blocks may be tagged based on their data size. For example, the total pixel count of each compressed block, including its lower resolution image block and delta image block, may be used by bandwidth limit inspector 207. In step 511, all the compressed color blocks included in a transfer frame may be ordered by their data sizes. In step 512, the largest or next largest compressed color block in the transfer frame may be considered. The current compressed color block may be tagged with delta removal flag in step 513.

In step 514, the total data size determined in step 311 may be reduced by the size of the delta image block corresponding to the current color block. That is, an updated total data size may be determined as if the resolution of the current compressed color block is reduced. In step 515, the updated total data size may be compared with the predetermined threshold of step 312 again. If the updated total data size is still larger than the threshold, the algorithm may go back to step 512 and tag the next largest compressed color block of the transfer frame. The algorithm can iterate through steps 512-515 until the updated total data size is smaller than the threshold or until all the color blocks in the transfer frame have been considered. After step 515, exemplary process 51 may terminate.

FIG. 5a shows a flow chart of a second exemplary operation process 52 for tagging the compressed color blocks. In exemplary process 52, compressed color blocks may be tagged based on the orders of dominance of their corresponding color planes. In step 511, the order of dominance may be determined for each color plane. For example, bandwidth limit inspector 207 may include a dominance calculator to determine an order of dominance between a plurality of color planes with respect to an image. A color plane can be considered "dominant" with respect to an image, if the color data in that color plane contributes to the printed color image to a greater degree than data in the other color planes. In some embodiments, dominance may be determined in accordance with the sensitivity of the human eye. Therefore, when viewing an image, the dominant color may evoke greater sensitivity in the human eye. For example, a more dominant color plane may include denser data than a less dominant color plane in representing the printed image. As another example, data in a more dominant color plane may have a higher resolution than data in a less dominant color plane.

Various algorithms may be used by the dominance calculator to determine the dominance of one color relative to other colors. In some embodiments, an order of dominance between color planes, for an image, may be determined by counting the number of bitmap dots in each color plane and ranking the planes based on the count. For example, a color with the lowest number of bitmap dots may be determined as the least dominant color. In some other embodiments, order of dominance between color planes may also be determined by generating gradation histograms for each color and ranking the colors based on the complexity of the histograms. A gradation histogram may be a histogram chart indicating the distribution of color gradation in an image. For example, complexity of the histogram may be affected by the breadth, number of peaks, and other parameters of the histogram. For an image, the color plane with the simplest gradation histogram may be determined to be the least dominant color plane. For example, Y-plane 10 may be determined as the least dominant color plane for a CMYK color image. Dominance calculator 215 may assign a number to each color plane indicating its dominance rank among the color planes. For example, a smaller number may be assigned to a less dominant color plane.

In step 522, all the compressed color blocks included in a transfer frame may be ordered by the orders of dominance of their corresponding color planes. In step 523, the least or next least dominant color plane may be considered. The compressed color block of the current color may be tagged with a delta removal flag in step 524.

In step 525, the total data size determined in step 311 may be reduced by the size of the delta image block of the current color block. In step 526, the updated total data size may be compared with the predetermined threshold of step 312. If the updated total data size is still larger than the threshold, the algorithm may go back to step 523 and tag the compressed color block of the next least dominant color. The algorithm can iterate through steps 523-526 until the updated total data size is smaller than the threshold or until all the color planes have been considered. After step 526, exemplary process 53 may terminate.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for reducing data size of at least one bitmap image, wherein the bitmap image comprises a plurality of color blocks, wherein each color block is associated with a distinct color plane, the method comprising:
   compressing the bitmap image;
   determining at least one compressed color block that is contained in a transfer frame, based on information pertaining to a physical offset between successive color planes when they are rendered on a print medium;
   tagging at least one compressed color block in the transfer frame, if the size of the transfer frame exceeds a threshold; and
   reducing the resolution of the at least one compressed color block that is tagged.

2. The method of claim 1, wherein the threshold is determined based in part on a bandwidth of a communication interface that transfers the compressed bitmap image.

3. The method of claim 1, wherein the threshold is determined based in part on a print speed of a printer to which the compressed bitmap image is transferred.

4. The method of claim 1, wherein compressing the bitmap image comprises compressing a lower resolution image and a delta image derived from the bitmap image.

5. The method of claim 1, wherein reducing the resolution of each compressed color block comprises removing a delta image block corresponding to the compressed color block.

6. The method of claim 1, wherein tagging at least one compressed color block in the transfer frame, comprises.
reducing the size of the transfer frame by the size of the delta image block corresponding to a largest untagged color block in the transfer frame; and
tagging the largest untagged compressed color block, if the reduced size of the transfer frame exceeds the threshold.

7. The method of claim 1, wherein tagging at least one compressed color block in the transfer frame, comprises.
determining a dominance rank for each color plane;
reducing the size of the transfer frame by the size of the delta image block corresponding to a least-dominant untagged compressed color block in the transfer frame; and
tagging the least-dominant untagged compressed color block, if the reduced size of the transfer frame exceeds the threshold.

8. The method of claim 1, wherein tagging at least one compressed color block in the transfer frame, further comprises tagging each compressed color block that is in a same print frame as the compressed color block that is tagged.

9. A method for reducing data size of at least one bitmap image, wherein the bitmap image comprises a plurality of color blocks, wherein each color block associated with a distinct color plane, the method comprising:
compressing the bitmap image;
determining the number of compressed color blocks that are contained in a transfer frame, based on information pertaining to a physical offset between successive color planes when they are rendered on a print medium;
computing an available bandwidth for each compressed color block, based on the number of compressed color blocks contained in a transfer frame;
tagging at least one compressed color block in the transfer frame, if the size of the compressed color block exceeds a threshold; and
reducing the resolution of the at least one compressed color block that is tagged.

10. The method of claim 9, wherein the threshold is proportional to the available bandwidth.

11. The method of claim 9, wherein computing the available bandwidth for each compressed color block is further based on a bandwidth of a communication interface that transfers the compressed color block.

12. A non-transitory computer-readable medium that contains instructions which, when executed by a processor, performs steps in a method for reducing data size of at least one bitmap image, wherein the bitmap image comprises a plurality of color blocks, wherein each color block is associated with a distinct color plane, the method comprising:
compressing the bitmap image;
determining at least one compressed color block that is contained in a transfer frame, based on information pertaining to a physical offset between successive color planes when they are rendered on a print medium;
tagging at least one compressed color block in the transfer frame, if the size of the transfer frame exceeds a threshold; and
reducing the resolution of the at least one compressed color block that is tagged.

13. The non-transitory computer-readable medium of claim 12, wherein tagging at least one compressed color block in the transfer frame, comprises:
reducing the size of the transfer frame by the size of the delta image block corresponding to a largest untagged color block in the transfer frame; and
tagging the largest untagged compressed color block, if the reduced size of the transfer frame exceeds the threshold.

14. The non-transitory computer-readable medium of claim 12, wherein tagging at least one compressed color block in the transfer frame, comprises:
determining a dominance rank for each color plane;
reducing the size of the transfer frame by the size of the delta image block corresponding to a least-dominant untagged compressed color block in the transfer frame; and
tagging the least-dominant untagged compressed color block, if the reduced size of the transfer frame exceeds the threshold.

15. The non-transitory computer-readable medium of claim 12, wherein tagging at least one compressed color block in the transfer frame, further comprises tagging each compressed color block that is in a same print frame as the compressed color block that is tagged.

16. The non-transitory computer-readable medium that contains instructions which, when executed by a processor, performs steps in a method for reducing data size of at least one bitmap image, wherein the bitmap image comprises a plurality of color blocks, wherein each color block associated with a distinct color plane, the method comprising:
compressing the bitmap image;
determining the number of compressed color blocks that are contained in a transfer frame, based on information pertaining to a physical offset between successive color planes when they are rendered on a print medium;
computing an available bandwidth for each compressed color block, based on the number of compressed color blocks contained in a transfer frame;
tagging at least one compressed color block in the transfer frame, if the size of the compressed color block exceeds a threshold; and
reducing the resolution of the at least one compressed color block that is tagged.

17. The non-transitory computer-readable medium of claim 16, wherein the threshold is proportional to the available bandwidth.

18. A system for reducing data size of at least one bitmap image, wherein the bitmap image comprises a plurality of color blocks, wherein each color block is associated with a distinct color plane, the system comprises:
a compressor configured to compress the bitmap image;
a bandwidth limit inspector configured to:
determine at least one compressed color block that is contained in a transfer frame, based on information pertaining to a physical offset between successive color planes when they are rendered on a print medium; and
tag at least one compressed color block in the transfer frame, if the size of the transfer frame exceeds a threshold; and
a formatter configured to reduce the resolution of the at least one compressed color block that is tagged.

19. The system of claim 18, wherein the bandwidth limit inspector is further configured to:
reduce the size of the transfer frame by the size of the delta image block corresponding to a largest untagged color block in the transfer frame; and
tag the largest untagged compressed color block, if the reduced size of the transfer frame exceeds the threshold.

20. A system for reducing data size of at least one bitmap image, wherein the bitmap image comprises a plurality of color blocks, wherein each color block is associated with a distinct color plane, the system comprises:
  a compressor configured to compress the bitmap image;
  a bandwidth limit inspector configured to:
    determine the number of compressed color blocks that are contained in a transfer frame, based on information pertaining to a physical offset between successive color planes when they are rendered on a print medium;
    compute an available bandwidth for each compressed color block, based on the number of compressed color blocks contained in a transfer frame; and
    tag at least one compressed color block in the transfer frame, if the size of the compressed color block exceeds a threshold; and
  a formatter configured to reduce the resolution of the at least one compressed color block that is tagged.

* * * * *